United States Patent
Stephens et al.

[11] 3,782,684
[45] Jan. 1, 1974

[54] SEAT INSERT FOR BUTTERFLY-TYPE VALVES

[75] Inventors: Leonard J. Stephens, Pittsburgh, Pa.; Derril D. Granger; John S. McCullagh, both of Canal Fulton, Ohio; Donald K. Hagar, Macungie, Pa.

[73] Assignee: Rockwell International Corporation, Pittsburgh, Pa.

[22] Filed: Sept. 20, 1971

[21] Appl. No.: 181,986

[52] U.S. Cl. ............................................. 251/306
[51] Int. Cl. .......................................... F16k 1/226
[58] Field of Search .................. 277/1, 168, 178; 138/140, 145; 251/306

[56] References Cited
UNITED STATES PATENTS

| | | |
|---|---|---|
| 3,118,681 | 1/1964 | Fuchrer ................................ 277/9 |
| 3,329,398 | 7/1967 | Goldsmith ........................... 251/306 |
| 3,338,551 | 8/1967 | Black .................................. 251/306 |
| 3,647,180 | 3/1972 | Church ............................... 251/306 |
| 3,263,960 | 8/1966 | Trefil et al. ......................... 251/306 |
| 3,537,683 | 11/1970 | Snell .................................. 251/306 |
| 3,540,691 | 11/1970 | Snell ............................... 251/306 X |

*Primary Examiner*—Henry T. Klinksiek
*Assistant Examiner*—Robert J. Miller
*Attorney*—William A. Strauch et al.

[57] ABSTRACT

A butterfly valve comprising an annular body rotatably mounts a closure disc that has peripheral engagement with a resilient seat in the form of a liner unit having an axial snap-in fit within an annular recess around the inner periphery of said body. Bonding between the liner and body may be effected by a layer of epoxy cement.

14 Claims, 5 Drawing Figures

INVENTORS
LEONARD J. STEPHENS
DERRIL D. GRANGER
JOHN S. McCULLAGH
DONALD K. HAGAR

BY Strauch, Nolan, Neale,
Nies & Kurz   ATTORNEYS

PATENTED JAN 1 1974 3,782,684

INVENTORS
LEONARD J. STEPHENS
DERRIL D. GRANGER
JOHN S. McCULLAGH
DONALD K. HAGAR

BY Strauch, Nolan, Neale,
Nies & Kurz   ATTORNEYS

SEAT INSERT FOR BUTTERFLY-TYPE VALVES

This invention relates to valves of the rotary disk or butterfly type wherein the disk is moved into peripheral engagement with a resilient annular seat in the closed position of the valve. The invention is of particular importance to valves of this type wherein the resilient seat is incorporated in a relatively narrow valve body adapted to be installed at the end of a pipeline. The valve body is secured to a terminal pipeline flange where the valve serves as an effective termination of the pipeline.

Resilient seat butterfly valves have been proposed, as for example as disclosed in the patents to Phillips U.S. Pat. No. 1,977,351, Stillwagon Nos. 2,740,426 and 2,994,342 and Scaramucci No. 3,118,465; and the present invention in its preferred embodiment will be disclosed as an improvement over such.

The art represented by the foregoing patents demonstrates various modes of mounting a resilient seat annulus within the valve body, in such fashion that the disc periphery may have sealing engagement all around the annulus. Problems of assembly are encountered as well as retention of the annulus in the presence of line pressures. Another problem is that of renewal of the seat because in time particularly in some severe services abrasive or solid materials may damage the resilient seat surface to the point that the closed valve may leak.

The present invention contemplates a novel solution of many of these problems by providing a special mode and structure for reliably mounting a resilient seat ring insert in a valve body so that it resists displacement due to normal line pressures and the forces exerted during engagement by the moving disk, but it can be removed for replacement or repair, and this is the major object of the invention.

Another object of the invention is to provide a novel valve assembly and method of assembly in which an annular seat ring is inserted in an axial snap-in manner into the valve body. Pursuant to the above, further objects reside in the provisions of various mechanical details such as an annular inclined camming surface on at least one side of the body for uniformly compressing the resilient seat ring annulus as it is being inserted and enabling it to reexpand to interfit with the body, and cooperating recess and rib formations on the body and annulus.

Further objects will appear as the description proceeds in connection with the appended claims and the annexed drawings.

PREFERRED EMBODIMENTS

Figure 1:
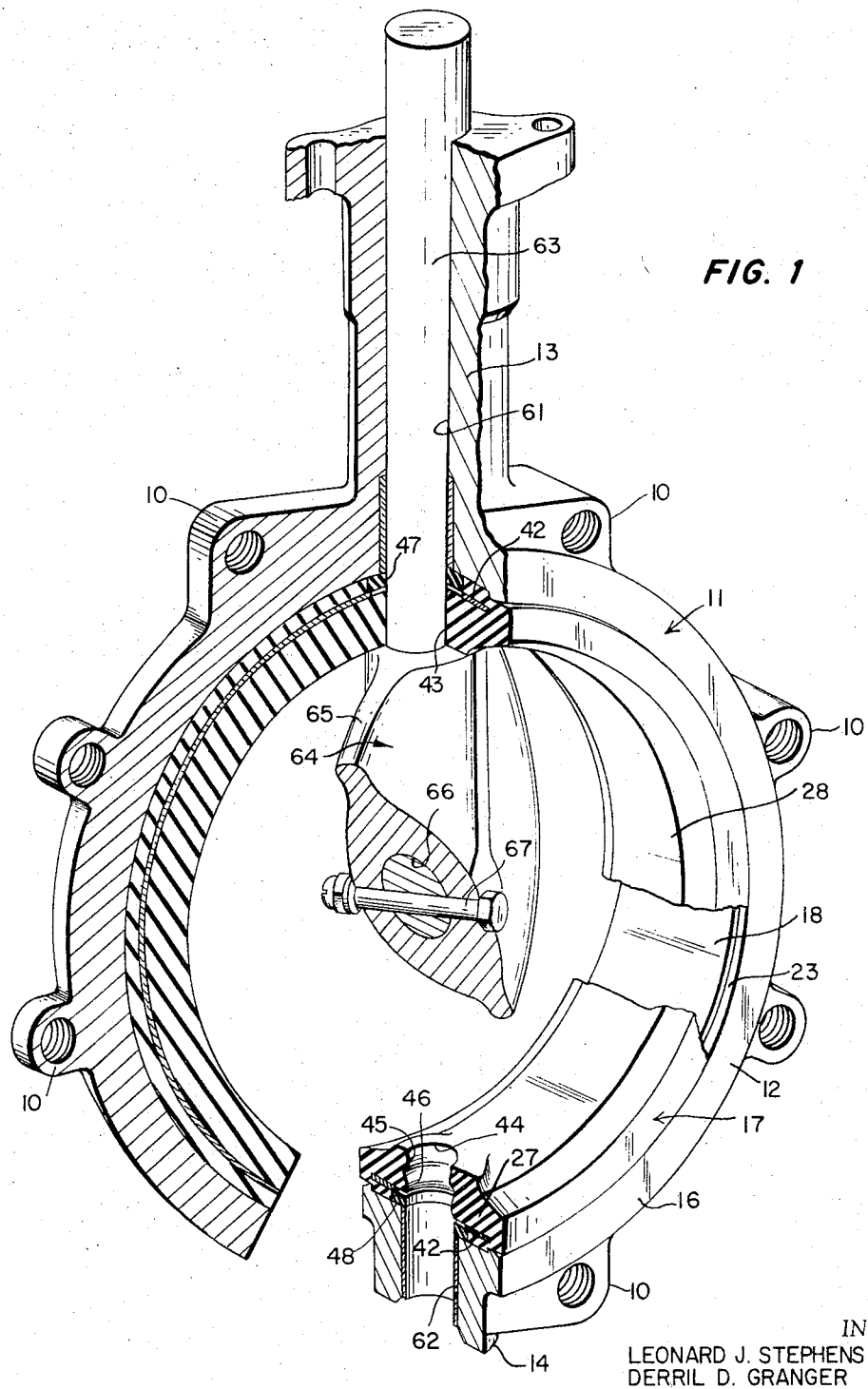
FIG. 1 is a generally perspective view partly cut away and partly sectioned showing a butterfly valve assembly according to a preferred embodiment of the invention.

A valve body 11 comprises a rigid metal annulus 12, usually cast iron, formed with diametrically opposite upper and lower hollow bosses 13 and 14. Externally body 11 is integrally formed with a series of circumferentially spaced threaded bore lugs 10 for bolting it to a terminal pipeline flange (partly shown in FIG. 2 and mainly conventional). The opposite sides of the body are preferably flat parallel surfaces 15 and 16 perpendicular to the flow axis of the body (FIG. 2).

An annular seat ring assembly 17 is mounted within the inner periphery of the body, and as will appear this assembly 17 has an axial snap-in mounting within the body.

Figure 2:
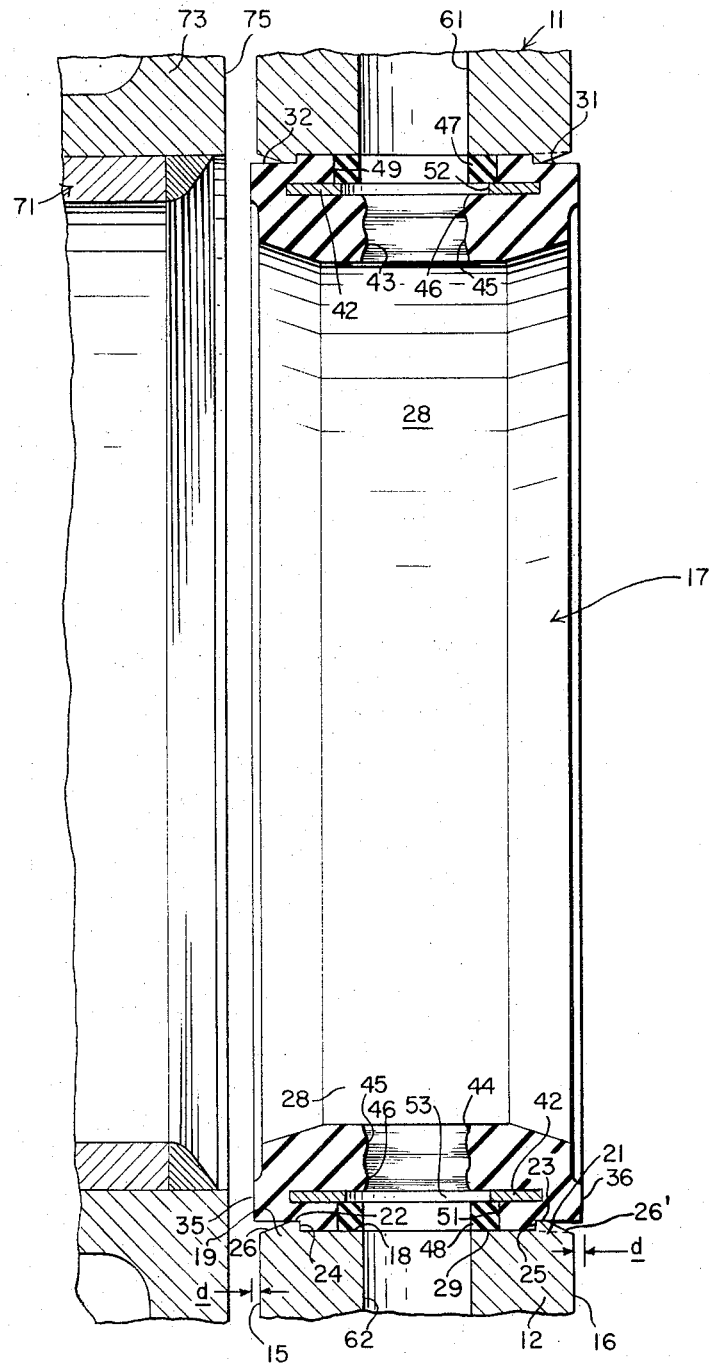
FIG. 2 is a transverse section showing the related peripheral contours of the valve body and seat ring providing snap-in installation according to the invention, the pipeline flange being shown somewhat exaggerately spaced from the valve body to illustrate the assembly prior to drawing the flange and body together.

Referring to FIG. 2, body 11 is formed with a cylindrical recess surface 18 disposed axially between annular end ribs 19 and 21 having cylindrical surfaces 22 and 23 of the same diameter respectively coaxial with surface 18. Parallel annular shoulders 24 and 25 face each other at opposite sides of surface 18 and intersect surfaces 22 and 23 in rounded corners. The outer edges of ribs 19 and 21 are formed with inclined annular surfaces 26 and 26' that slope axially and radially inwardly to intersect surfaces 22 and 23 respectively, preferably adjacent shoulders 24 and 25 so that the cylindrical surfaces 22 and 23 are relatively narrow axially.

Seat ring assembly 17 comprises an integral annular molded synthetic rubber, plastic or like elastomeric member 27 having concentric inner and outer cylindrical peripheral surfaces 28 and 29. At opposite sides, the outer periphery is formed with narrow reduced diameter regions 31 and 32 of the same diameter that extend axially outwardly from parallel shoulders 33 and 34 that are perpendicular to the axis of the seat ring. Thus annular member 27 is formed with a substantially continuous annular rib 30 projecting into the body recess at 18. Annulus 27 has opposite parallel side surfaces 35 and 36 preferably perpendicular to the axis of the seat ring.

As shown the inner periphery of the annulus 27 may be formed with axially and radially outwardly inclined regions 37 and 38 along the opposite side edges. Similarly the side surfaces of the annulus 27 may be recessed around the inner periphery as shown at 39 and 41.

Preferably a sheet metal reenforcing insert 42 is molded within annulus 27 radially inwardly of rib 30, and annulus 27 is formed with diametrically opposite aligned shaft receiving bores 43 and 44 of the same diameter. The walls of these bores are preferably formed with annular ribs 45 and 46 which are compressed against the valve stem in the assembly. Preferably bores 43 and 44 are enlarged radially outwardly of the reenforcement insert 42, as shown at 49 and 51. Square cross section resilient washers 47 and 48 are mounted in these enlarged bore portions axially confined between reenforcement insert 42 and the adjacent body wall. The reenforcement insert 42 is formed with aligned openings 52 and 53 of greater diameter than bores 43 and 44. The compressed ribs 45 and 46 are relied upon as the primary seals to prevent leakage along the valve stem, and washers 47 and 48 are secondary or back-up seals for the purpose.

Figure 3:
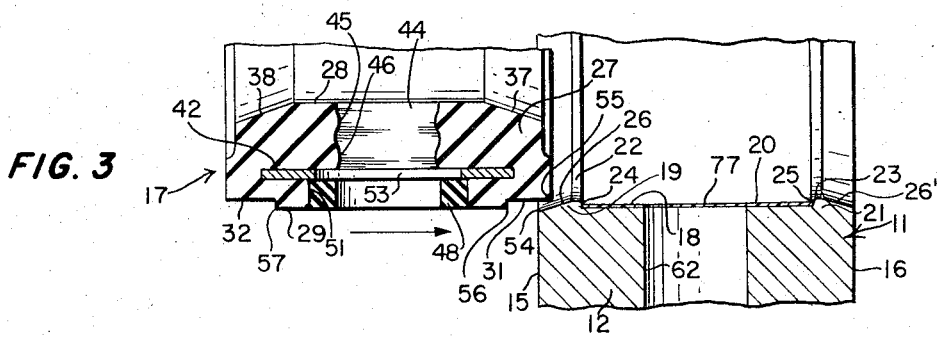
FIG. 3 is an enlarged fragmentary view in section illustrating how the seat ring is introduced into the valve body.
Figure 4:
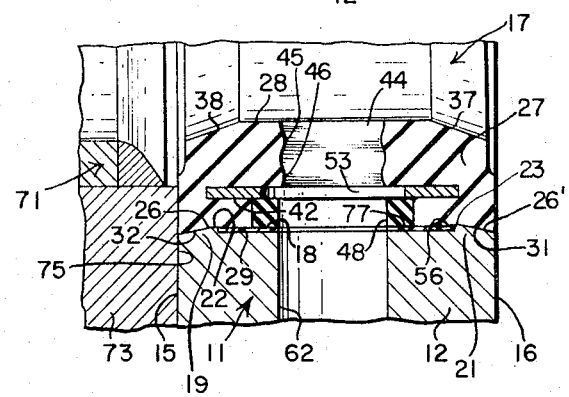
FIG. 4 is an enlarged partial section showing the condition of the parts when the pipeline flange and the valve assembly have been drawn together.
Figure 5:
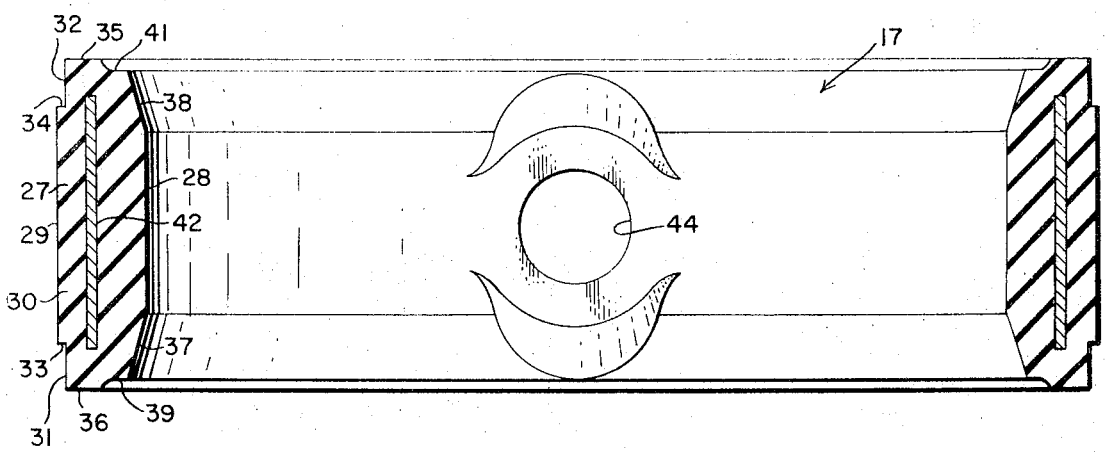
FIG. 5 is a section substantially normal to that of FIG. 2 showing detail of the seat ring insert.

Seat ring assembly 17 is introduced and mounted within valve body 11 as illustrated in FIGS. 3 and 4. It is axially aligned with the body opening and then shifted in the direction of the arrow in FIG. 3. The diameter of outer surface 29 of the seat ring is approximately equal to the diameter of body recess surface 18 and preferably somewhat smaller than the diameter of circular edge 54 indicated at the outer side of inclined surface 26. The diameters of seat ring surfaces 31 and 32 are approximately equal to the diameters of body surfaces 22 and 23; and the heights of seat ring shoulders 33 and 34 are substantially equal to the heights of body shoulders 24 and 25.

Thus, since the diameter at body surface 22 is substantially the same as the seat ring diameter at 31, the leading corner 55 of the moving seat ring during insertion will pass smoothly slidably over surface 22, but the corner 56 of the largest diameter of resilient annulus 27 will encounter inclined surface 26 and the annulus will deform radially inwardly under uniform compression all around its leading region at the valve body opening. During further axial shift of the seat ring in the same direction the radially contracted annulus will slide smoothly over surface 22, with the leading corner 55 eventually passing freely within the peripheral confines of body surface 23. However, once corner 56 passes beyond surface 22, it will be free to reexpand with the result that by the time it reaches shoulder 25 it will be of larger diameter than body surface 23. This limits the axial shift of seat ring 17 and indicates that it has been fully inserted into the body.

The longitudinal length of seat ring rib surface 29 is such that by the time corner 56 reaches shoulder 25 the trailing corner 57 will be about ready to clear shoulder 24, after which the intermediate larger diameter section of the annulus is free to expand into snug fit with body surface 18. The foregoing takes place as an essentially snap-in action, the resilient annulus contracting and then automatically expanding into substantially full surface engagement with surrounding body surfaces.

Upon full insertion, the set ring 17 is disposed within the body as shown in FIG. 2. It will be noted that the longitudinal dimension of relaxed resilient annulus 27 are such that each annular side surfaces 35 and 36 may extend a small distance d outwardly of surfaces 15 and 16. It will be noted also that the side surfaces 35 and 36 are radially adjacent the opposite sides of reenforcement insert 42.

With further reference to FIGS. 1 and 2, it will be seen that the valve body is formed with cylindrical bores 61 and 62 extending through bosses 13 and 14 respectively for rotatably mounting a valve stem 63 carrying a valve closure disc element 64. Bores 43, 44, 61 and 62 are essentially of the same size and coaxial in the valve assembly. The generally cylindrical periphery 65 of disc 64 is of slightly greater diameter than seating surface 28 of the seat ring annulus for uniform sealing engagement when the disc is rotated to closed valve position.

A suitable operator (not shown) is provided for rotating stem 63 between a fully closed position with disc periphery 65 in pressure tight contact with the seat ring 17 and intermediate open positions up to fully open with disc 64 parallel to the flow axis. The seat ring at bores 43 and 44 and seal rings 47 and 48 are under compression around stem 63 to prevent loss of pressure along the stem. If desired any further suitable bearings or packings may be provided around stem 63 within the body bosses in accord with conventional practice.

It will be noted that, as a matter of assembly, stem 63 passes entirely through a diametral bore 66 in disc 64, and a suitable fastener such as the bolt indicated at 67 fixes disc 64 non-rotatably and axially in stem 63. This is more or less conventional structure enabling disc 64 to be mounted within the inserted seat ring 17 with bore 66 in alignment with the body and seat ring bores, for reception of stem 63 which is then secured to it by the fastener.

Referring to FIGS. 2 and 4, connection of the valve assembly 11 to a pipeline is illustrated. In FIG. 2, the valve assembly is shown disposed adjacent a pipe section 71 having an end flange 73 provided with a planar end face 75. Actually the usual spacing between the pipeline flange and the adjacent side of valve body 11 is exaggeratedly shown for purposes of clear disclosure in FIG. 2.

In any event, with the part positioned as in FIG. 2, a series of bolts extending between flange 73 and the lugs 10 on the valve body are tightened to draw flange surface 75 into flush contact with valve body surface 15. This is illustrated in FIG. 4. As shown in FIG. 4 surface 75 contacts the side surface of the resilient annulus and exerts a force laterally of the annulus in the region containing the reenforcing element 42. The laterally projecting seat ring annulus is thereby stressed in axial compression and usually the annulus undergoes expansion and engages inclined surface 26.

An important part of the invention lies in the fact that (FIG. 3) before seat ring 17 is axially inserted internal body surfaces 24, 18 and 25 are preferably coated with a layer 77 of of a suitable liquid bonding material such as an epoxy-type adhesive. This adhesive, while in fluid state, effectively lubricates axial insertion of the seat ring and fills any voids between the engaged surfaces of the annulus 27 and the metal valve body 11. The epoxy adhesive provides when solidified a tight full surface bond between the seat ring and valve body; resisting mechanical and fluid pressure forces incident to normal pipeline operation that might tend to displace seat ring 17 with respect to the valve body.

While the adhesive layer 77 may provide some sealing, it is not relied upon primarily as a seal, the primary seal with respect to fluid flow through the valve being provided at the interfaces 75, 15 by the axial compression of resilient annulus 27.

An important phase of the invention lies in the fact that the body 11 is laterally symmetrical about a plane containing the axes of bores 61 and 62 and perpendicular to the flow axis, and the insert 17 is laterally symmetrical about a plane containing the axes of bores 43 and 44 and perpendicular to the flow axis, these planes coinciding in the assembly. Thus the insert 17 is reversible and may be introduced into either side of the body, the same action taking place when it is inserted from the right in FIG. 3 as when it is inserted from the left as above described. Furthermore the valve assembly 11 is similarly symmetrical and reversible so that it may be secured with either end facing the pipeline end flange.

In a practical embodiment it has been found desirable to eliminate that portion of one body rib 21 indicated in dotted lines in FIG. 2 for two minor circumferential lengths corresponding to the diameters of washers 47 and 48, for enabling insertion of the liner from that side when the rubber washers have been installed on the liner before insertion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A valve assembly comprising a rigid annular body having means for rotatably mounting a valve passage closure member, and means mounting a resilient seat annulus within said body for peripheral engagement with said closure member comprising means defining an annular recess extending around the inner periphery of said body, an integral annular peripheral rib on said annulus fitting within said recess, and means providing for axial insertion of said resilient seat annulus within said body comprising means on said body for substantially uniformly radially contracting at least the rib portion of said resilient annulus during insertion and permitting reexpansion of said rib portion into said recess.

2. The valve assembly defined in claim 1, wherein said means for contracting said annulus comprises an annular surface sloping radially and axially inwardly from at least one edge of said body.

3. The valve assembly defined in claim 2, wherein said recess comprises opposite annular side shoulders, and said sloping surface is disposed adjacent one of said shoulders.

4. The valve assembly defined in claim 1, wherein at least said rib portion of the annulus is surface bonded to said body within the recess.

5. The valve assembly defined in claim 4, wherein bonding is effected by a layer of epoxy-type cement between the annulus and body.

6. The valve assembly defined in claim 1, wherein said body recess is a relatively wide shallow recess having a cylindrical bottom surface intersecting parallel annular side shoulder surfaces, said shoulders extending radially inwardly to intersect cylindrical body surfaces disposed at opposite sides of the recess and having diameters smaller than that of the recess bottom wall, said annulus rib being correspondingly shaped, and said means for contracting the resilient annulus comprising a generally conical surface around at least one side edge of the body sloping radially and axially inwardly from an outer edge that has a diameter at least as large as that of said annulus rib to intersect said cylindrical body surface at that side of the body.

7. The valve assembly defined in claim 6, wherein said body is laterally symmetrical with annular surfaces similarly sloping radially and axially inwardly from both edges of the body, and said resilient annulus being laterally symmetrical and reversible end for end whereby said annulus may be randomly inserted from either side of said body.

8. A valve assembly comprising a rigid annular body having opposite parallel side surfaces, a cylindrical recess extending around the inner periphery of said body axially inwardly of both side surfaces and having opposite axially inwardly facing parallel side shoulders, an integral seat annulus of elastomeric material mounted within the body having an external cylindrical rib portion projecting within said recess for axial retention therein, said rib portion having parallel ends axially engaging said shoulders and said annulus having cylindrical sides of smaller external diameter than said rib portion projecting axially beyond both of said body side surfaces, a circumferentially extending metal reenforcement insert imbedded in said annulus radially inwardly of said rib portion, the projecting cylindrical sides of said annulus being disposed radially adjacent the opposite sides of said insert, and means for rotatably mounting a valve closure disk on said body.

9. In the valve assembly defined in claim 8, means comprising a layer of epoxy-type adhesive providing full surface bonding between the external periphery of said seat annulus and the recessed internal periphery of said body.

10. A valve assembly comprising a rigid annular body having opposite parallel side surfaces, an annular recess extending around the inner periphery of said body axially inwardly of both side surfaces and having opposite axially inwardly facing side shoulders, a resilient seat annulus mounted within the body having an external rib portion projecting within said recess for axial retention therein and having annular sides projecting axially beyond both of said body side surfaces, and means for rotatably mounting a valve closure disk on said body, said rib portion of the annulus being cylindrical with a diameter substantially the same as that of said recess which is also cylindrical, and at least one side of said body being formed with an inclined generally conical surface sloping radially and axially inwardly from an outer edge that has a diameter at least as large as said rib portion to an inner region wherein the diameter is less than that of said rib portion.

11. The valve assembly defined in claim 10, wherein a similar inclined conical surface is formed around the other side of said body.

12. The valve assembly defined in claim 10, wherein said resilient annulus has cylindrical surfaces of the same diameter at opposite sides of said rib fitting with cylindrical surfaces of corresponding diameter at opposite sides of said body recess.

13. A valve assembly comprising a rigid annular body having opposite parallel side surfaces, a cylindrical recess extending around the inner periphery of said body axially inwardly of both side surfaces and having opposite axially inwardly facing parallel side shoulders, a resilient seat annulus mounted within the body having an external cylindrical rib portion projecting within said recess for axial retention therein, said rib portion having parallel ends engaging said shoulders and said annulus having cylindrical sides of smaller external diameter than said rib portion projecting axially beyond both of said body side surfaces, a circumferentially extending metal insert imbedded in said annulus radially inwardly of said rib portion, said annulus being formed with diametrically opposite valve stem receiving through bores each having portions radially inwardly of said insert dimensioned to sealingly surround a valve stem and each having an enlarged diameter portion radially outwardly of said insert with said insert being provided with valve stem surrounding openings in registry with said bores, said enlarged diameter bore portions opening outwardly through said rib portion, resilient valve stem seal rings seated in said enlarged bore portions, and means for rotatably mounting a valve closure member on said body comprising a valve stem rotatably mounted on the body and extending through said bores.

14. A valve assembly comprising a rigid annular body having opposite parallel side surfaces, an annular recess extending around the inner periphery of said body axially inwardly of both side surfaces and having opposite axially inwardly facing side shoulders, a resilient seat annulus mounted within the body having an external rib portion projecting within said recess for axial retention therein and having annular sides of smaller external diameter than said rib portion projecting axially beyond both of said body side surfaces, a circumferentially extending metal insert imbedded in said annulus radially inwardly of said rib portion, said annulus being formed with diametrically opposite valve stem receiving through bores each having portions radially inwardly of said insert dimensioned to sealingly surround a valve stem and each having an enlarged diameter portion radially outwardly of said insert with said insert being provided with valve stem surrounding openings in registry with said bores, said enlarged diameter bore portions opening outwardly through said rib portion, resilient valve stem seal rings seated in said enlarged bore portions, and means for rotatably mounting a valve closure member on said body comprising a valve stem rotatably mounted on the body and extending through said bores, said body recess providing annular body ribs at opposite sides thereof and minor circumferential lengths of one of said ribs being eliminated to provide laterally open gaps located adjacent the valve stem and corresponding in length to the diameters of said seal rings.

* * * * *